(12) United States Patent
Yamamoto (10) Patent No.: US 7,319,437 B2
(45) Date of Patent: Jan. 15, 2008

(54) IMAGE DISPLAY DEVICE (75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 534 days.

(21) Appl. No.: 10/524,269

(22) PCT Filed: Aug. 12, 2003

(86) PCT No.: PCT/JP03/10231

§ 371 (c)(1),
(2), (4) Date: Feb. 11, 2005

(87) PCT Pub. No.: WO2004/017122

PCT Pub. Date: Feb. 26, 2004

(65) Prior Publication Data

US 2005/0237271 A1    Oct. 27, 2005

(30) Foreign Application Priority Data

Aug. 12, 2002  (JP) .............................. 2002-235141
Mar. 4, 2003   (JP) .............................. 2003-057782
Mar. 4, 2003   (JP) .............................. 2003-057783

(51) Int. Cl.
*G09G 5/00* (2006.01)
(52) U.S. Cl. ................. 345/8; 345/7; 359/630
(58) Field of Classification Search .......... 345/1.1–1.3, 345/7–9; 359/11, 14, 630–633; 351/157; 349/11; 348/53
See application file for complete search history.

(56) References Cited

U.S. PATENT DOCUMENTS 6,034,653 A * 3/2000 Robertson et al. ............. 345/8

(Continued)

FOREIGN PATENT DOCUMENTS

JP       07-209600        8/1995

(Continued)

OTHER PUBLICATIONS

English Lanugage Abstract of JP -A-7-209600 Copy of International Search Report.

*Primary Examiner*—Richard Hjerpe
*Assistant Examiner*—Mansour M. Said
(74) *Attorney, Agent, or Firm*—Michael Bednarek; Paul, Hastings, Janofsky & Walker, LLP (57) ABSTRACT

To provide an image display device of the type that presents images in a certain part of the field of vision in which the image display device can be used for prolonged periods of time.

An image display device 1 includes a main body 10 having a shape of a glasses frame, a right-eye display device 20R and a left-eye display device 20L. Each of the right-eye display device 20R and the left-eye display device 20L is for displaying a predetermined image and is provided in such a manner that it is not very clearly visible for a user when the user wearing the main body 10 on his or her head looks straight ahead and that it becomes clearly visible for the user only when the user moves his or her forward-looking eyes away. The user can get a forward field of vision and can see the images displayed on the right-eye display device 20R and the left-eye display device 20L when he or she looks at 45 degrees down. The right-eye display device 20R and the left-eye display device 20L may be fixed to the main body 10 at a spacing corresponding to the distance between the eyes of the user.

16 Claims, 4 Drawing Sheets

U.S. PATENT DOCUMENTS 6,091,546 A * 7/2000 Spitzer ............... 359/618
6,384,982 B1 * 5/2002 Spitzer ............... 359/630
6,483,483 B2 * 11/2002 Kosugi et al. ........... 345/8
6,486,855 B1 * 11/2002 Pandolfi ............... 345/7

FOREIGN PATENT DOCUMENTS

WO  WO 01/06298 A1  1/2001

* cited by examiner

IMAGE DISPLAY DEVICE

TECHNICAL FIELD

The present invention relates to a small image display device that can be used while worn on the head.

BACKGROUND OF THE INVENTION

Head mounted displays (HMDs), which are used while worn on the head to place a video screen in front of each eye of the user, find applications in various fields including the field of virtual reality. Typical HMDs are designed in the shape of a frame of goggles or large glasses that block out outside light and force the user to see only the HMD's pictures. With an HMD used, the user can view images irrespective of the direction he or she faces but then again it gives the user visual isolation from the surrounding environment.

In recent years, small image display devices have been proposed that allow users to view both images and the surrounding environment by means of presenting the images in a certain part of the field of vision.

The image display device of this type is disclosed in, for example, Japanese patent laid-open document (JP-A-7-209600). This image display device has a liquid crystal display (LCD), a reflecting mirror, an ocular lens and other components contained within a single housing. The housing has a clip attached thereto. This clip is used for mounting the image display device onto a glasses or sunglasses frame. The housing is placed on top of either right or left lens of the glasses over the outside surface of it. An image that is displayed on the LCD is directed to one eye of the user in a diagonal down direction through the reflecting mirror, the ocular lens, and the lens of the glasses.

The image display device of this type provides the user with a choice between seeing the surrounding environment and seeing images by the movement of the eyes. It has a high value in terms of its availability in everyday life at any place both inside and outside a building.

This image display device has, however, something to be improved.

The reason is that images are seen with only one eye in this image display device. Seeing images with one eye often triggers user eyestrain and places a heavy burden on the beholding user. Therefore, this image display device is not suited for use for prolonged periods of time.

A possible solution to the aforementioned problem is to develop an image display device having a pair of display means: right-eye display means and left-eye display means.

However, the distance between both eyes and the vision of a person vary among individuals. Even with an image display device having two display means, a mismatch between the user and the two display means can cause eyestrain of the user.

There has been no image display device of the type that presents images in a certain part of the field of vision in which the image display device solves the aforementioned problems and gives a user the opportunity of its use for prolonged periods of time, sometimes of a long-time viewing of images.

An object of the present invention is to provide an image display device of the type that presents images in a certain part of the field of vision in which the image display device can be used for prolonged periods of time.

SUMMARY OF THE INVENTION

In order to solve the aforementioned problem, the present inventor proposes the following invention.

The present invention is an image display device comprising a main body that can be worn on the head of a user; right-eye display means for displaying a predetermined image, said right-eye display means being provided on or in said main body in such a manner that said image is blurred or beyond the visible range of the right eye of said user when said user wearing said main body on his or her head looks straight ahead, and that said image is caught by the right eye of said user when said user moves his or her straight-looking right eye away; and left-eye display means for displaying a predetermined image, said left-eye display means being provided on or in said main body in such a manner that said image is blurred or beyond the visible range of the left eye of said user when said user wearing said main body on his or her head looks straight ahead, and that said image is caught by the left eye of said user when said user moves his or her straight-looking left eye away. In this image display device, good visibility is obtained for both eyes when said user wearing said main body on his or her head looks straight ahead. In addition, said right-eye display means and/or said left-eye display means are/is provided in such a manner that they/it can be positioned and fixed to said main body at a certain position or positions suited for the right and left eyes of said user.

The image display device comprises two display means: said right-eye display means and said left-eye display means. Therefore, said user will not suffer from excessive eyestrain due to the fact that there is one display means. Furthermore, said right-eye display means and/or said left-eye display means in this image display device are/is provided in such a manner that they/it can be positioned and fixed to said main body at a certain position or positions suited for the positions of the right and left eyes of said user. By providing these positional options, eyestrain of said user due to individual variability in vision and distance between the eyes occurs less frequently. This gives said user the opportunity of its use for prolonged periods of time, in particular a long-time viewing of images.

Said right-eye display means and/or said left-eye display means in the image display device of the present invention are/is provided in such a manner that they/it can be positioned and fixed to said main body at a certain position or positions suited for the positions of the right and left eyes of said user. Either one of said right-eye display means and said left-eye display means may be movable, or alternatively, both of them may be movable. The direction of movement and a mechanism for movement are not specifically limited.

Said right-eye display means and said left-eye display means can be provided in such a manner that they can be positioned in a right-and-left direction and fixed depending on the distance between the eyes of said user. For viewing images with both eyes, it is so much important that the gap between said right-eye display means and said left-eye display means matches the distance between the eyes in order to suppress eyestrain associated with the user's viewing images. Any mismatch can increase eyestrain as well as make it difficult to see images. On the contrary, good alignment with the eyes significantly reduces eyestrain associated with the user's viewing images.

Said right-eye display means and said left-eye display means may be anything that can display images, and a mechanism/structure for image production is not specifically limited. Each of them comprises, for example, at least a display screen on which images are shown and an optical system to guide an image shown on said display screen to the eye(s) of said user. In addition, each of said right-eye display means and said left-eye display means comprises said display screen and said optical system as described above, and may be formed as an integrated unit. With said right-eye display means and said left-eye display means being formed as an integrated unit, it is easy to attach them to said main body later. It is easy to position said right-eye display means and/or said left-eye display means at a certain position or positions suited for the positions of the right and left eyes of said user and fix them to said main body. Said right-eye display means and said left-eye display means, each of which is formed as an integrated unit, may be provided in such a manner that they can be positioned in a right-and-left direction and fixed depending on the distance between the eyes of said user.

Regardless of whether each of said right-eye display means and said left-eye display means is formed as an integrated unit, the aforementioned optical system may comprise a lens for focusing an image displayed on said display screen to the retina of the right or left eye of said user. Said lens may be replaceable with another lens according to the vision of the right or left eye of said user in order to appropriately focus said image to the retina of the right or left eye of said user. This allows said user to see images with less eyestrain regardless of the vision of said user. The lens may be a single lens or a combination of two or more lenses. Characteristics of the lens(es) may be modified by any one of suitable techniques. The characteristics may be modified by the choice and the number of lenses. If two or more lenses are used, the characteristics may be modified by moving at least one of the lenses along an optical path to change the distance between the lenses and fixing them at these positions. If there is one lens, the aforementioned characteristics may be changed by means of moving that lens along the optical path and then fixing it. In this case, said optical system comprises a single lens for focusing an image displayed on said display screen to the retina of the right or left eye of said user, said lens being provided in such a manner that it can be positioned and fixed at a certain position along an optical path between said display screen and the retina according to the vision of the right or left eye of said user in order to appropriately focus said image to the retina of the right or left eye of said user.

Said main body may have any one of suitable shapes. The only requirements are that said display means can be provided on or in said main body and that said main body does not obstruct the user's field of vision when said user wearing said main body on his or her head looks straight ahead.

Said main body may have a shape of, for example, glasses. The shape of glasses in this case includes a shape of goggles.

When it has a shape of glasses, said main body comprises a glasses frame having lower segments corresponding to the right and left eyes. In this case, said right-eye display means may be attached to the lower segment corresponding to the right eye and said left-eye display means may be attached to the lower segment corresponding to the left eye. It should be noted that the glasses frame as used herein may have a shape like a figure eight lying on its side. What is required is a lower portion of the glasses frame.

When it has a shape of glasses, said main body may be fitted around lenses of glasses for the right and left eyes. In this case, said right-eye display means may be provided at a lower end of the lens for the right eye and said left-eye display means may be provided at a lower end of the lens for the left eye. Said glasses as used herein may be either prescription glasses or not. In addition, right and left lenses of said glasses may be connected in series.

When each of said right-eye display means and said left-eye display means is formed as an integrated unit, said main body may comprise right-eye holding means and left-eye holding means for firmly holding, at appropriate positions, said right-eye display means and said left-eye display means each of which is formed as an integrated unit. With said right-eye holding means and said left-eye holding means used, it is easier to attach said right-eye display means and said left-eye display means to said main body later. In addition, it becomes easier to fix said right-eye display means and said left-eye display means to said main body after they are positioned at certain positions suited for the positions of the right and left eyes of said user.

A structure/mechanism of said right-eye holding means and said left-eye holding means is not specifically limited as long as they serve to firmly hold said right-eye display means and said left-eye display means, each of which is formed as an integrated unit, at appropriate positions. For example, each of them may comprise two sandwich-holding plates that are arranged up and down in parallel to each other along the length thereof, each of said right-eye display means and said left-eye display means being provided in such a manner that they can be positioned in a right-and-left direction and fixed depending on the distance between the eyes of said user by means of holding said right-eye display means or said left-eye display means, each of which is formed as an integral unit, between said sandwich-holding plates at an appropriate position along the length thereof. Each of said right-eye holding means and said left-eye holding means in this case may comprise an elastic body that is arranged on at least one of said two sandwich-holding plates along said length. With this, said right-eye display means or said left-eye display means can be held firmly between said sandwich-holding plates of said right-eye holding means or said left-eye holding means using the holding pressure of the elastic body. As a result, it becomes easier to fix said right-eye display means and said left-eye display means to said main body after they are positioned at certain positions suited for the positions of the right and left eyes of said user.

Said right-eye holding means or said left-eye holding means may be configured as follows. Said right-eye display means is provided in such a manner that said image is caught by the right eye of said user when said user wearing said main body on his or her head moves his or her straight-looking right eye down at a predetermined angle equal to or larger than 20 degrees, and said left-eye display means is provided in such a manner that said image is caught by the left eye of said user when said user wearing said main body on his or her head moves his or her straight-looking left eye down at a predetermined angle equal to or larger than 20 degrees, with said right-eye display means or said left-eye display means, each of which is formed as an integrated unit, being held with said right-eye holding means or said left-eye holding means.

Said right-eye display means and said left-eye display means in this case become clearly visible for said user only when said user moves his or her eyes down at an angle equal to or larger than 20 degrees. This is for the purpose of avoiding that said right-eye display means or said left-eye display means obstructs the user's view of the surrounding environment when said user looks straight ahead and reducing eyestrain of said user during image viewing. The reason why this reduces eyestrain of said user during image viewing is as follows.

One's downward looking at something (with his or her face facing the front and with downcast eyes, the same applies hereinafter) below his or her horizontal line of sight activates the parasympathetic nervous system. On the other hand, one's upward looking at something (with his or her face facing the front and with upward glance, the same applies hereinafter) above his or her horizontal line of sight activates the sympathetic nervous system.

To put it simply, the parasympathetic nervous system is active during sleep. It acts to conserve body energy. The sympathetic nervous system is active during waking hours. It acts to use energy. Stimulation of the parasympathetic nervous system results in low blood pressure, pupil constriction, slow heart rate and breathing, and increase in gastrointestinal motility. On the contrary, sympathetic stimulation results in high blood pressure, pupil dilation, fast heart rate and breathing, and decrease in gastrointestinal motility.

As apparent from the above, one can activate his or her parasympathetic nervous system by looking at something below his or her horizontal line of sight with downcast eyes, thereby to achieve a relaxed state.

When the image display device of the present invention is as described above, said right-eye display means and said left-eye display means are positioned in such a manner that they become clearly visible for said user only when said user moves his or her eyes down at an angle equal to or larger than 20 degrees. A natural consequence of this is that said display means is always looked at with downcast eyes. The parasympathetic nervous system activated thereby promotes a relaxed state in looking at an image, which allows said user to see images without causing eyestrain. The phrase "becomes clearly visible for the user when the user moves his or her eyes down at an angle equal to or larger than 20 degrees" as used herein includes both the case that the user's eyes catch an image upon the right-angled movement of the user's straight-looking eyes to the ground and the case that the user's eyes catch an image upon the diagonal movement of the user's eyes. The same applies to other angles.

Said right-eye display means and said left-eye display means may be provided on or in said main body in such a manner that they become clearly visible for said user only when said user moves his or her eyes down at an angle between 20 degrees and 70 degrees, both inclusive. It is difficult to look down at an angle larger than 70 degrees, so that a user forced to do so would feel even more eyestrain.

Said right-eye display means and said left-eye display means may be provided on or in said main body in such a manner that they become clearly visible for said user only when said user moves his or her eyes down at approximately 45 degrees. The user eyestrain can be minimized under the condition that the angle at which said user moves his or her eyes down to see images is approximately 45 degrees.

When each of said right-eye display means and said left-eye display means is formed as an integrated unit, said optical system contained in said right-eye display means and said left-eye display means may comprise lenses for focusing an image displayed on said display screen to the retina of the right or left eye of said user. The lenses in this case are designed in such a manner that the central axis of the lens for the right eye generally coincides with the line of sight of the right eye of said user and the central axis of the lens for the left eye generally coincides with the line of sight of the left eye of said user when said user moves his or her right or left eye down at said predetermined angle equal to or larger than 20 degrees. This provides easier viewing of images displayed on said right-eye display means and said left-eye display means when said user moves his or her eyes down at a predetermined angle equal to or larger than 20 degrees and they become clearly visible for said user, suppressing eyestrain.

A display device that serves as said right-eye display means and said left-eye display means of the aforementioned image display device, and a main body are valuable as a component which makes up said image display device.

An example of them is given below.

Such a display device is a display device which is a component of said image display device. The image display device comprises a main body that can be worn on the head of a user; right-eye display means for displaying a predetermined image, said right-eye display means being provided on or in said main body in such a manner that said image is blurred or beyond the visible range of the right eye of said user when said user wearing said main body on his or her head looks straight ahead, and that said image is caught by the right eye of said user when said user moves his or her straight-looking right eye away; and left-eye display means for displaying a predetermined image, said left-eye display means being provided on or in said main body in such a manner that said image is blurred or beyond the visible range of the left eye of said user when said user wearing said main body on his or her head looks straight ahead, and that said image is caught by the left eye of said user when said user moves his or her straight-looking left eye away; good visibility being obtained for both eyes when said user wearing said main body on his or her head looks straight ahead, said right-eye display means and/or said left-eye display means being provided in such a manner it/they can be positioned and fixed to said main body at a certain position or positions suited for the right and left eyes of said user. The aforementioned display device serves as right-eye display means or left-eye display means for said image display device. This display device comprises at least a display screen on which images are shown and an optical system to guide an image shown on said display screen to the eye(s) of said user, said display device being formed as an integrated unit.

A main body which is a component of such an image display device comprises a main body that can be worn on the head of a user; right-eye display means for displaying a predetermined image, said right-eye display means being provided on or in said main body in such a manner that said image is blurred or beyond the visible range of the right eye of said user when said user wearing said main body on his or her head looks straight ahead, and that said image is caught by the right eye of said user when said user moves his or her straight-looking right eye away; and left-eye display means for displaying a predetermined image, said left-eye display means being provided on or in said main body in such a manner that said image is blurred or beyond the visible range of the left eye of said user when said user wearing said main body on his or her head looks straight ahead, and that said image is caught by the left eye of said user when said user moves his or her straight-looking left eye away; good visibility being obtained for both eyes when said user wearing said main body on his or her head looks straight ahead, said right-eye display means and/or said left-eye display means being provided in such a manner it/they can be positioned and fixed to said main body at a certain position or positions suited for the right and left eyes of said user, and further comprising at least a display screen on which images are shown and an optical system to guide an image shown on said display screen to the eye(s) of said user. Said main body which is a component of said image display device is adapted to be worn on the head of said user, said main body comprising right-eye holding means and left-eye holding means for firmly holding said right-eye display means and said left-eye display means, each of which is formed as an integrated unit, at an appropriate position.

BEST MODE FOR CARRYING OUT THE INVENTION

First and second preferred embodiments of the present invention are described in detail below with reference to the drawing.

In the description of these embodiments, same components and parts are represented by the same reference numerals. A redundant description may be omitted.

First Embodiment

Figure 1:
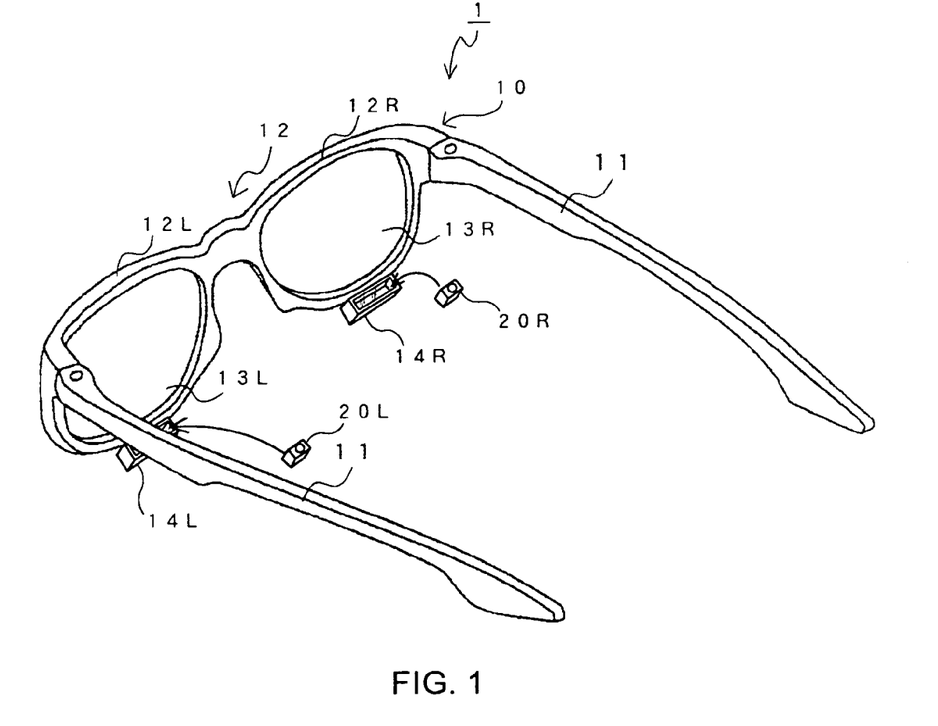
FIG. 1 is a perspective view showing the whole of an image display device according to a first embodiment, seen from the back.

FIG. 1 is a perspective view showing the whole of an image display device 1, seen from the back, according to a first embodiment of the present invention.

This image display device 1 comprises a main body 10, and a right-eye display device 20R and a left-eye display device 20L for displaying images.

The main body 10 in this embodiment has a shape of, but not limited to, a glasses frame. It comprises temples 11 and a frame 12.

The image display device 1 is used while worn on the head of a user. The temples 11 fit over the user's ears to keep the image display device 1 on the head of the user.

The frame 12 includes a right-eye frame 12R and a left-eye frame 12L. The right-eye frame 12R is a frame segment that rests in front of the right eye of the user when the image display device 1 is kept on the head of the user. The left-eye frame 12L is a frame segment that rests in front of the left eye of the user when the image display device 1 is mounted. While not necessarily being required, each of the frames 12L and 12R in this embodiment has a closed curved profile. Lower portions of the frames 12L and 12R serve as lower segments of the present invention.

The right-eye frame 12R and the left-eye frame 12L in this embodiment are fitted around a right-eye lens 13R and a left-eye lens 13L, respectively. Each of the right-eye lens 13R and the left-eye lens 13L is a curved piece of non-prescription, colorless, and transparent glass. Of course, the right-eye lens 13R and the left-eye lens 13L may be prescription lenses or colored lenses. Alternatively, they may be made of a material other than glass, such as a resin. Furthermore, the right-eye lens 13R and the left-eye lens 13L may be omitted.

A right-eye socket 14R and a left-eye socket 14L are provided at respective lower portions of the right-eye frame 12R and the left-eye frame 12L. The right-eye socket 14R is for fixing the right-eye display device 20R to the main body 10 at a suitable position aligned with the right eye of the user. The left-eye socket 14L is for fixing the left-eye display device 20L to the main body 10 at a suitable position aligned with the left eye of the user.

As will be described below, the right-eye socket 14R and the left-eye socket 14L in this embodiment are adapted to support the right-eye display device 20R and the left-eye display device 20L, respectively, at a predetermined angle above the horizontal.

Figure 2:
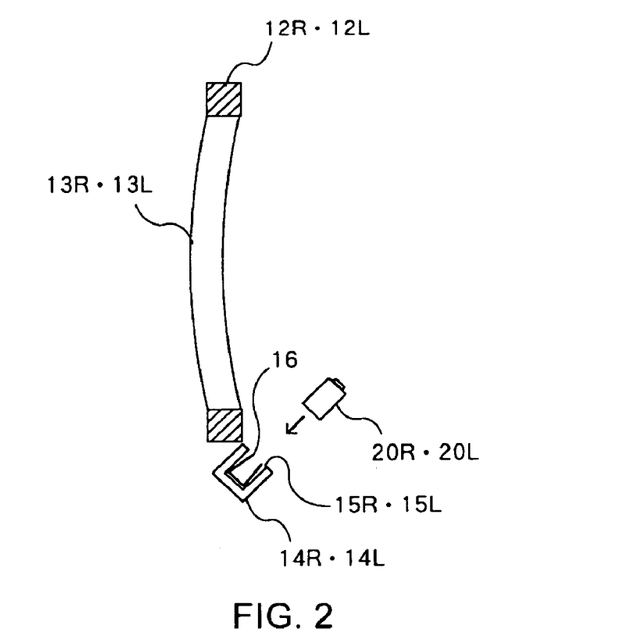
FIG. 2 is a side cross-sectional view showing a structure of a right-eye socket and a left-eye socket in the image display device shown in FIG. 1.

Each of the right-eye socket 14R and the left-eye socket 14L in this embodiment has a rectangular cross section with one surface opened to the air as openings 15R and 15L, as shown in FIG. 2. The right-eye display device 20R is fitted into the right-eye socket 14R through the opening 15R and fixed in the right-eye socket 14R accordingly. The left-eye display device 20L is fitted into the left-eye socket 14L through the opening 15L and fixed in the left-eye socket 14L accordingly.

In order to keep the right-eye display device 20R and the left-eye display device 20L at a predetermined angle above the horizontal, the openings 15R and 15L in the right-eye socket 14R and the left-eye socket 14L, respectively, according to this embodiment are each inclined at a predetermined angle above the horizontal.

For the purpose of firmly holding the right-eye display device 20R, the opening 15R in the right-eye socket 14R has a width (the length of the opening 15R along the latitudinal direction thereof) that is approximately equal to the length of the right-eye display device 20R along the vertical direction thereof ("the vertical direction of the right-eye display device 20R" refers to the length of the right-eye display device 20R along the vertical direction thereof in the case where which side of the right-eye display device is laid along the vertical direction and which side along the horizontal direction are predetermined; this will be described below). Therefore, inserting the right-eye display device 20R into the right-eye socket 14R through the opening 15R requires some force. The right-eye display device 20R inserted into the right-eye socket 14R through the opening 15R has a perfect fit in the right-eye socket 14R. Likewise, for the purpose of firmly holding the left-eye display device 20L, the opening 15L in the left-eye socket 14L has a width (the length of the opening 15L along the latitudinal direction thereof) that is approximately equal to the length of the left-eye display device 20L along the vertical direction thereof ("the vertical direction of the left-eye display device 20L" refers to the length of the left-eye display device 20L along the vertical direction thereof in the case where which side of the left-eye display device is laid along the vertical direction and which side along the horizontal direction are predetermined; this will be described below). Therefore, inserting the left-eye display device 20L into the left-eye socket 14L through the opening 15L requires some force. The left-eye display device 20L inserted into the left-eye socket 14L through the opening 15L has a perfect fit in the left-eye socket 14L.

In the case described above, the right-eye display device 20R is held between two opposed plates (they correspond to the sandwich-holding plates of the present invention) that are provided on the upper and lower sides of the right-eye socket 14R. The left-eye display device 20L is held between two opposed plates (they correspond to the sandwich-holding plates of the present invention) that are provided on the upper and lower sides of the left-eye socket 14L.

While not necessarily being required, a leaf spring 16 as shown in FIG. 2 is disposed inside the right-eye socket 14R and the left-eye socket 14L in this embodiment with a view to holding the right-eye display device 20R and the left-eye display device 20L more firmly. The leaf spring is bent to have a generally trapezoid shape in cross section with the narrower end opened to the air. The right-eye display device 20R and the left-eye display device 20L are inserted into a gap defined by the opposite sloping sides of their corresponding leaf spring 16. As a result, the right-eye display device 20R and the left-eye display device 20L are pressed against the opposite sloping sides of the leaf spring 16. This ensures a perfect fit of the right-eye display device 20R in the right-eye socket 14R as well as a perfect fit of the left-eye display device 20L in the left-eye socket 14L.

The length of the right-eye socket, 14R along the longitudinal direction thereof is longer than the length of the right-eye display device 20R along the horizontal direction thereof ("the horizontal direction of the right-eye display device 20R" refers to the length of the right-eye display device 20R along the horizontal direction thereof in the case where which side of the right-eye display device is laid along the vertical direction and which side along the horizontal direction are predetermined; this will be described below). Therefore, the right-eye display device 20R can be held within the right-eye socket 14R at a suitable position in the right-eye socket 14R along the longitudinal direction thereof. This position is determined so that a predetermined relative alignment is achieved between the right-eye display device 20R and the right eye of the user. Likewise, the length of the left-eye socket 14L along the longitudinal direction thereof is longer than the length of the left-eye display device 20L along the horizontal direction thereof ("the horizontal direction of the left-eye display device 20L" refers to the length of the left-eye display device 20L along the horizontal direction thereof in the case where which side of the left-eye display device is laid along the vertical direction and which side along the horizontal direction are predetermined; this will be described below). Therefore, the left-eye display device 20L can be held within the left-eye socket 14L at a suitable position in the left-eye socket 14L along the longitudinal direction thereof. This position is determined so that a predetermined relative alignment is achieved between the left-eye display device 20L and the left eye of the user.

The positioning of the right-eye display device 20R and the left-eye display device 20L makes it possible to align the right-eye display device 20R and the left-eye display device 20L with the eyes of the user.

Figure 3:
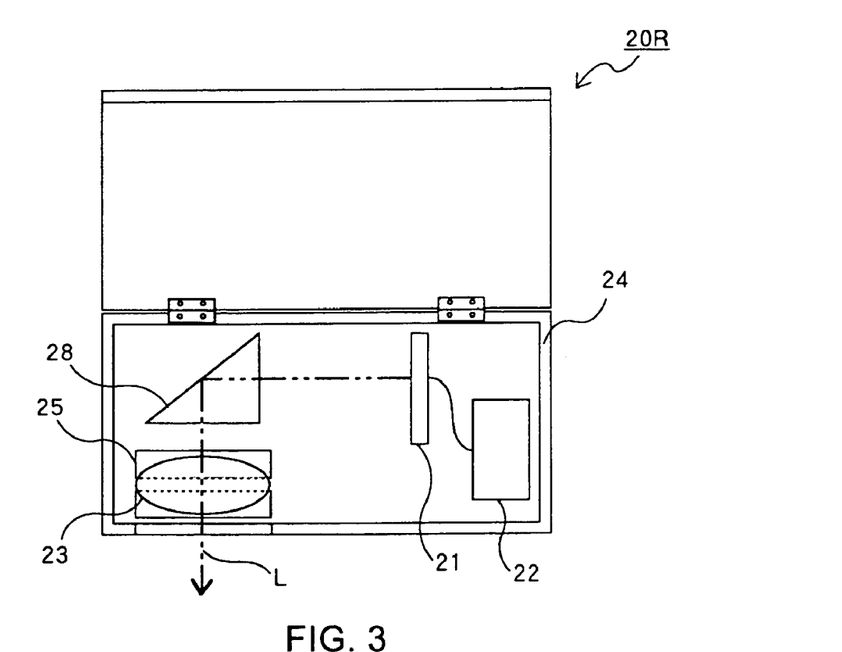
FIG. 3 is a plan view showing a structure of a right-eye display device in the image display device shown in FIG. 1.

Next, a structure of the right-eye display device 20R and the left-eye display device 20L is described mainly with reference to FIG. 3. The right-eye display device 20R and the left-eye display device 20L in this embodiment are arranged in, but not limited to, a bilaterally symmetric fashion. Thus, only the right-eye display device 20R is described below. No description will be made about a structure of the left-eye display device 20L.

The right-eye display device 20R includes a display screen 21, a controller 22, and an imaging lens 23, as shown in FIG. 3. While not necessarily being required, these components are contained in a storage box 24 having a rectangular parallelepiped shape in this embodiment. The right-eye display device 20R is formed as an integrated unit. A line L shown in FIG. 3 indicates an optical path of the light traveling from the display screen 21 to the eye of the user.

The display screen 21 is a surface on which images are shown. A liquid crystal display is used for the display screen 21 in this embodiment from a viewpoint of easy downsizing.

The controller 22 is for controlling images to be displayed on the display screen 21. The controller 22 receives an image signal, such as a video signal or an RGB signal, by wire or wireless from the outside of the right-eye display device 20R, to produce images from the image signal on the display screen 21. The controller 22 is not required to be provided within the right-eye display device 20R. All or a part of it may be provided outside the right-eye display device 20R. In addition, the controller 22 may have a TV tuner. In such a case, the controller 22 receives an airwave for normal television broadcast and decodes it to produce TV pictures on the display screen 21. Images to be displayed on the display screen 21 by the controller 22 are not specifically limited to the above. Instead, they can be various kinds of images including those reproduced from image data that are stored on a storage medium such as a DVD, as well as those reproduced from image data that are generated by a computer such as a personal computer or a gaming device.

The imaging lens 23 is for directing an image shown on the display screen 21 to the eye of the user and focusing the image on the eye. The front surface of the storage box 24 (one of the surfaces of the storage box that faces the eye of the user during use) has a hole formed therein. A part of the imaging lens 23 is exposed through the hole. While the imaging lens 23 in this embodiment is illustrated as a single lens, it may be a combination of two or more lenses.

Figure 4:
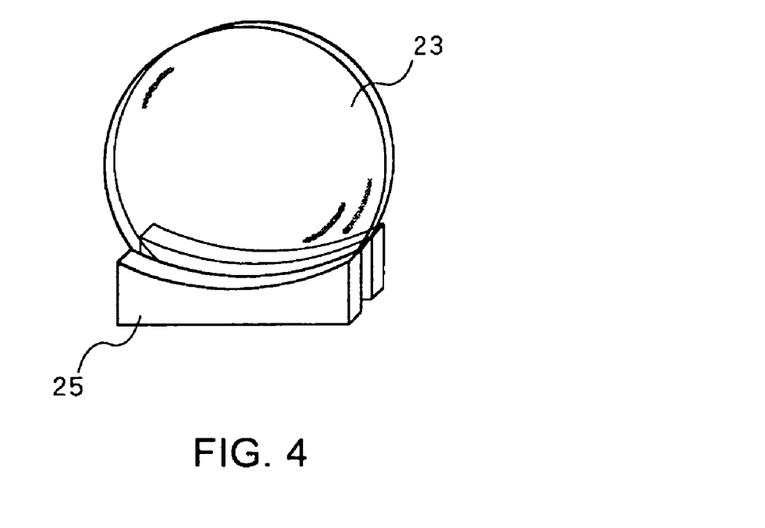
FIG. 4 is a perspective view showing a mechanism of fixing an imaging lens used in the right-eye display device shown in FIG. 3.

While not necessarily being required, this embodiment offers choices of the imaging lens 23. This choice depends upon the vision of the user (more specifically, the vision in the right eye). Any one of suitable mechanisms may be used to allow for choices of the imaging lens 23. In this embodiment, a configuration as shown in FIGS. 3 and 4 is used to allow for choices of the imaging lens 23. As shown in FIG. 3, the storage box 24 in this embodiment has a top surface that can be opened and closed using, for example, a hinge. The storage box also has a lens holder 25 on the inner bottom thereof. The lens holder has a gap in which the imaging lens 23 rests and is supported from below. Different imaging lenses 23 are made available to accommodate individual differences in vision of users. One of them is picked out according to the results of a visual acuity test. The top surface of the storage box 24 is opened, and the selected imaging lens 23 is slid into the lens holder 25. In this way, an imaging lens 23 can be selected and fitted.

The aforementioned choices of the lens are for appropriately focusing images displayed on the display screen 21 on the retina of the right eye of the user. However, the images displayed on the display screen 21 may appropriately be focused on the retina by means of providing positional options for the imaging lens 23 in such a manner that the imaging lens can be fixed at a certain position on an optical path between the display screen 21 and the retina, rather than by offering choices of the lens. This can be configured as follows (see FIG. 5). In this case, the storage box 24 has a top surface that can be opened and closed. The storage box 24 also has a lens holder 26 on the inner bottom thereof to hold the imaging lens 23. A threaded hole is formed in the lens holder 26 to pass through the lens holder 26 at a lower portion thereof along the optical axis of the imaging lens 23. A bolt 27 screws into the hole, passing through it. The bolt 27 also passes through the storage box 24. A slotted-head or Phillips head of the bolt exposes outside the storage box 24. With this configuration, it becomes possible to move the lens holder 26 and the imaging lens 23 forward and backward along the optical axis by placing a screwdriver in the slot in the head and turning the bolt 27 in an appropriate direction. Appropriate selection of the direction and angle of rotation of the bolt 27 achieves positioning of the imaging lens 23 along the optical axis.

To make the positioning meaningful, the right-eye display device 20R is fitted into the right-eye socket 14R in a predetermined orientation. The approximate up-and-down direction at that time, i.e., the direction perpendicular to the surface of FIG. 3 corresponds to the vertical direction of the right-eye display device 20R. The right-and-left direction at that time, i.e., the right-and-left direction of FIG. 3 corresponds to the horizontal direction of the right-eye display device 20R. The lengths in these directions are the length of the right-eye display device 20R along the vertical direction thereof and the length of the right-eye display device 20R along the horizontal direction thereof. The same applies to the left-eye display device 20L.

The right-eye display device 20R may have a reflector that is provided between the display screen 21 and the eye and that directs the light coming out of the display screen 21 by reflection. The reflector increases freedom of positioning of the display screen 21, the imaging lens 23, and the eye. The right-eye display device 20R in this embodiment has a reflector 28. While a mirror or a prism may be used as the reflector 28, a prism serves as the reflector 28 in this embodiment. The reflector 28 in this embodiment is provided between the display screen 21 and the imaging lens 23 to turn the light at 90 degrees. In other words, in this embodiment, the light that comes out of the display screen 21 is reflected from the reflector 28 and then focused on the retina of the right eye of the user after passing through the imaging lens 23.

How to use this image display device 1 is described.

In using this image display device 1, it is necessary to attach the right-eye display device 20R and left-eye display device 20L to the main body 10. Prior to this, the imaging lenses 23 in the right-eye display device 20R and the left-eye display device 20L should be adjusted.

The imaging lenses 23 are adjusted by means of choosing an imaging lens 23 according to the vision of the user or by means of moving the imaging lens 23. Since this embodiment offers choices of the imaging lens 23 as described above, adjustment of the imaging lens 23 is made by choosing an imaging lens 23.

Adjustment of the imaging lens 23 is made by: measuring the vision of the right and left eyes of the user, choosing an imaging lens 23 for the right eye and an imaging lens 23 for the left eye that are suitable for the vision, and fitting the imaging lenses 23 for the right and left eyes into the respective lens holders 25 within the right-eye display device 20R and the left-eye display device 20L, respectively.

Figure 5:
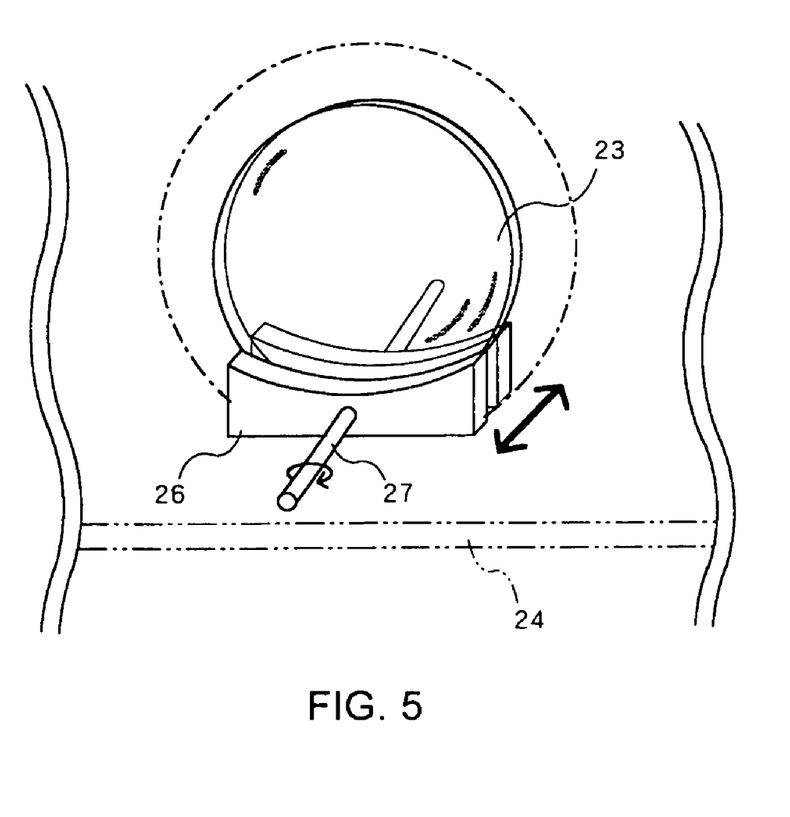
FIG. 5 is a perspective view showing another example of a mechanism of fixing an imaging lens used in the right-eye display device shown in FIG. 3.

In the aforementioned case where the imaging lens 23 can be positioned and fixed appropriately on the optical path between the display screen 21 and the retina, the imaging lens 23 provided within the right-eye display device 20R is positioned and fixed at a certain point on the optical path that is suited for the vision in the right eye of the user, and the imaging lens 23 provided within the left-eye display device 20L is positioned and fixed at a certain point on the optical path that is suited for the vision in the left eye of the user. When the mechanism used to position and fix the imaging lens 23 appropriately on the optical path between the display screen 21 and the retina is the one as described above, appropriate adjustment of the direction and angle of rotation of the bolts 27 results in positioning and fixing of the imaging lenses 23 within the right-eye display device 20R and the left-eye display device 20L.

The imaging lens 23 is thus adjusted.

Next, the right-eye display device 20R and the left-eye display device 20L are attached to the main body 10.

This attachment is made by fitting the right-eye display device 20R and the left-eye display device 20L into the right-eye socket 14R and the left-eye socket 14L, respectively, while adjusting their position so that they are aligned with the eyes of the user. Alignment of the right-eye display device 20R and the left-eye display device 20L with the eyes of the user can be performed more easily if the distance between the eyes of the user is measured before aligning the eyes of the user with the right-eye display device 20R and the left-eye display device 20L and the display devices are fitted into their respective sockets according to the measurement.

The image display device 1 having the right-eye display device 20R and the left-eye display device 20L attached to the main body 10 is used while worn on the head of the user as in normal glasses. To mount the image display device 1 on the head, the two temples 11 of the main body 10 are fitted over the user's ears to keep it on.

In this state, the user can get a clear vision of images displayed on the right-eye display device 20R and the left-eye display device 20L with his or her right and left eyes, respectively, of his or her own will.

It should be noted that the right-eye display device 20R and the left-eye display device 20L are provided at a lower segment of the right-eye frame 12R and the left-eye frame 12L of the main body 10 having a shape of a glasses frame, so that the right eye of the user cannot catch the image displayed on the right-eye display device 20R and the left eye of the user cannot catch the image displayed on the left-eye display device 20L as long as the user looks straight ahead. This means that the image display device 1 while worn on the head enables the user to get a forward field of vision to the extent that he or she is wearing normal glasses. A normal field of vision is available at least as long as the user looks straight ahead. Wearing this image display device 1 on the head does not work against everyday life of the user.

On the other hand, the right eye of the user wearing the image display device 1 on his or her head can catch the image displayed on the right-eye display device 20R and the left eye of the user can catch the image displayed on the left-eye display device 20L when the user moves his eyes down. The downcast angle is determined so that the imaging lens 23 exposed over the right-eye display device 20R faces the pupil of the right eye and the imaging lens 23 exposed over the left-eye display device 20L faces the pupil of the left eye.

Figure 6:
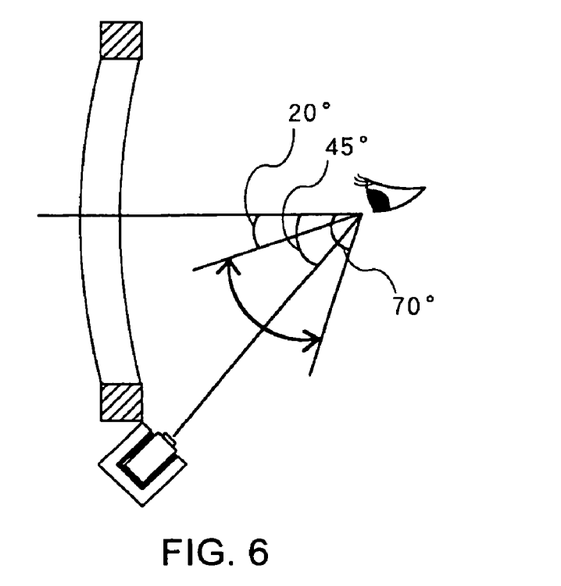
FIG. 6 is a side view schematically illustrating the relation between the right-eye display device and the right eye as well as the relation between the left-eye display device and the left eye during the use of the image display device shown in FIG. 1.

In this embodiment, the right eye can catch the image displayed on the right-eye display device 20R whereas the left eye can catch the image displayed on the left-eye display device 20L when the user looks down at an angle of, but not limited to, 45 degrees with his or her head facing the front (see FIG. 6). This angle is preferably at least 20 degrees in order to give a normal field of vision of the user during the time when the user does not look at the images displayed on the right-eye display device 20R and the left-eye display device 20L. The aforementioned angle is preferably not larger than 70 degrees because an unduly large angle prevents the user's easy seeing of the images displayed on the right-eye display device 20R and the left-eye display device 20L. The right-eye socket 14R and the left-eye socket 14L are attached to the lower segments of the right-eye frame 12R and the left-eye frame 12L, respectively, at an angle within the aforementioned range.

The light that comes out of the display screen 21 upon production of images on the display screen 21 under the control of the controller 22 is reflected from the reflector 28 and focused on the retina of the right or left eye of the user after passing through the imaging lens 23. The image is thus clearly visible for the user.

Second Embodiment

Figure 7:
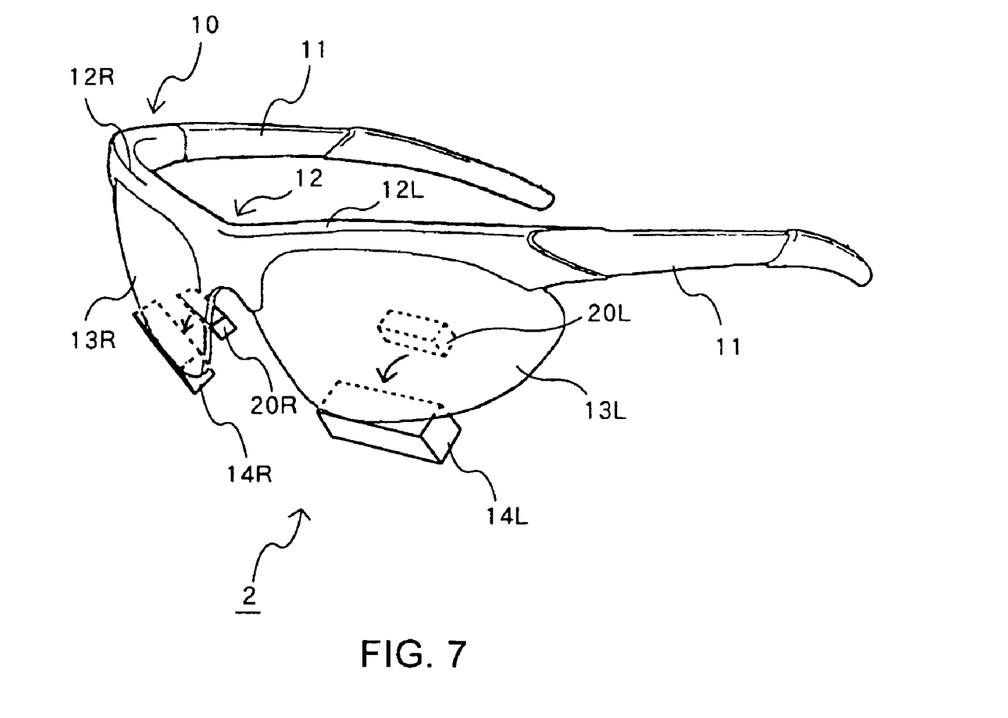
FIG. 7 is a perspective view showing the whole of an image display device according to a second embodiment, seen from the front.

FIG. 7 is a perspective view showing the whole of an image display device 2, seen from the front, according to a second embodiment of the present invention.

The image display device 2 comprises a main body 10, and a right-eye display device 20R and a left-eye display device 20L for displaying images as in the image display device 1 of the first embodiment.

The image display device 2 has a structure similar to that of the image display device 1 of the first embodiment. A way of using it is also similar. In particular, details of the right-eye display device 20R and the left-eye display device 20L are completely same as those in the image display device 1 of the first embodiment.

The difference between the image display device 2 of the second embodiment and the image display device 1 of the first embodiment lies in the structure of their main bodies 10 and the mechanism that is used to attach the right-eye socket 14R and the left-eye socket 14L to the main body 10.

The main body 10 of the image display device 2 comprises temples 11, a frame 12 having a right-eye frame 12R and a left-eye frame 12L, and a right-eye lens 13R and a left-eye lens 13L as in the image display device 1 of the first embodiment. However, unlike the image display device 1 of the first embodiment, the right-eye frame 12R and the left-eye frame 12L do not have a closed curved profile. In addition, they do not have lower segments that the image display device 1 of the first embodiment has.

Therefore, this image display device 2 cannot afford to fix the right-eye socket 14R and the left-eye socket 14L into the lower segments of the frame, which can be done in the image display device 1 of the first embodiment. Taking the above into consideration, in the image display device 2, the right-eye socket 14R is attached to the lower end of the right-eye lens 13R whereas the left-eye socket 14L is attached to the lower end of the left-eye lens 13L.

The structure of the right-eye socket 14R and the left-eye socket 14L, and the angle at which they are attached are similar to those of the image display device 1 of the first embodiment.

The invention claimed is:

1. An image display device comprising:
a main body that can be worn on the head of a user;
right-eye display means for displaying a predetermined image, said right-eye display means being provided on or in said main body in such a manner that said image is blurred or beyond the visible range of the right eye of said user when said user wearing said main body on his or her head looks straight ahead, and that said image is caught by the right eye of said user when said user moves his or her straight-looking right eye away; and
left-eye display means for displaying a predetermined image, said left-eye display means being provided on or in said main body in such a manner that said image is blurred or beyond the visible range of the left eye of said user when said user wearing said main body on his or her head looks straight ahead, and that said image is caught by the left eye of said user when said user moves his or her straight-looking left eye away;
good visibility being obtained for both eyes when said user wearing said main body on his or her head looks straight ahead,
said right-eye display means and/or said left-eye display means being provided in such a manner that they/it can be positioned and fixed to said main body at a certain position or positions suited for the right and left eyes of said user; and wherein said main body comprises a glasses frame having lower segments corresponding to the right and left eyes, said right-eye display means being provided on or in said lower segment of said glasses frame that is corresponding to the right eye whereas said left-eye display means being provided on or in said lower segment of said glasses frame that is corresponding to the left eye.

2. The image display device as claimed in claim 1, wherein said right-eye display means and said left-eye display means are provided in such a manner that they can be positioned in a right-and-left direction and fixed depending on the distance between the eyes of said user.

3. The image display device as claimed in claim 1, wherein each of said right-eye display means and said left-eye display means comprises at least a display screen on which images are shown and an optical system to guide an image shown on said display screen to the eye(s) of said user, each of said right-eye display means and said left-eye display means being formed as an integrated unit.

4. The image display device as claimed in claim 3, wherein said right-eye display means and said left-eye display means, each of which is formed as an integrated unit, are provided in such a manner that they can be positioned in a right-and-left direction and fixed depending on the distance between the eyes of said user.

5. The image display device as claimed in claim 3, wherein said optical system comprises a lens for focusing an image displayed on said display screen to the retina of the right or left eye of said user,
said lens being replaceable with another lens according to the vision of the right or left eye of said user in order to appropriately focus said image to the retina of the right or left eye of said user.

6. The image display device as claimed in claim 3, wherein said optical system comprises a single lens for focusing an image displayed on said display screen to the retina of the right or left eye of said user,
said lens being provided in such a manner that it can be positioned and fixed at a certain position along an optical path between said display screen and the retina according to the vision of the right or left eye of said user in order to appropriately focus said image to the retina of the right or left eye of said user.

7. The image display device as claimed in claim 3, wherein said main body comprises right-eye holding means and left-eye holding means for firmly holding, at appropriate positions, said right-eye display means and said left-eye display means each of which is formed as an integrated unit.

8. The image display device as claimed in claim 7, wherein each of said right-eye holding means and said left-eye holding means comprises two sandwich-holding plates that are arranged up and down in parallel to each other along the length thereof, each of said right-eye display means and said left-eye display means being provided in such a manner that they can be positioned in a right-and-left direction and fixed depending on the distance between the eyes of said user by means of holding said right-eye display means or said left-eye display means, each of which is formed as an integral unit, between said sandwich-holding plates at an appropriate position along the length thereof.

9. The image display device as claimed in claim 8, wherein each of said right-eye holding means and said left-eye holding means comprises an elastic body that is arranged along said length in at least one of said two sandwich-holding plates.

10. The image display device as claimed in claim 7, wherein said right-eye display means is provided in such a manner that said image is caught by the right eye of said user when said user wearing said main body on his or her head moves his or her straight-looking right eye down at a predetermined angle equal to or larger than 20 degrees, and said left-eye display means is provided in such a manner that said image is caught by the left eye of said user when said user wearing said main body on his or her head moves his or her straight-looking left eye down at a predetermined angle equal to or larger than 20 degrees, with said right-eye display means or said left-eye display means, each of which is formed as an integrated unit, being held with said right-eye holding means or said left-eye holding means.

11. The image display device as claimed in claim 10, wherein said optical system comprises lenses for focusing an image displayed on said display screen to the retina of the right or left eye of said user, the central axis of the lens for the right eye generally coinciding with the line of sight of the right eye of said user when the user moves his or her right eye down at said predetermined angle equal to or larger than 20 degrees, and the central axis of the lens for the left eye generally coinciding with the line of sight of the left eye of said user when the user moves his or her left eye down at said predetermined angle equal to or larger than 20 degrees.

12. The image display device as claimed in claim 1, wherein said main body has a shape of glasses.

13. The image display device as claimed in claim 12, wherein said main body comprises a glasses frame having lower segments corresponding to the right and left eyes, said right-eye display means being provided on or in said lower segment of said glasses frame that is corresponding to the right eye whereas said left-eye display means being provided on or in said lower segment of said glasses frame that is corresponding to the left eye.

14. The image display device as claimed in claim 12, wherein said main body is fitted around lenses of said glasses for the right and left eyes, said right-eye display means being provided at a lower end of the lens of said glasses for the right eye whereas said left-eye display means being provided at a lower end of the lens of said glasses for the left eye.

15. A display device which is a component of an image display device, said display device serving as right-eye display means or left-eye display means for said image display device, said image display device comprising:

a main body that can be worn on the head of a user;

right-eye display means for displaying a predetermined image, said right-eye display means being provided on or in said main body in such a manner that said image is blurred or beyond the visible range of the right eye of said user when said user wearing said main body on his or her head looks straight ahead, and that said image is caught by the right eye of said user when said user moves his or her straight-looking right eye away; and left-eye display means for displaying a predetermined image, said left-eye display means being provided on or in said main body in such a manner that said image is blurred or beyond the visible range of the left eye of said user when said user wearing said main body on his or her head looks straight ahead, and that said image is caught by the left eye of said user when said user moves his or her straight-looking left eye away;

good visibility being obtained for both eyes when said user wearing said main body on his or her head looks straight ahead, said right-eye display means and/or said left-eye display means being provided in such a manner it/they can be positioned and fixed to said main body at a certain position or positions suited for the right and left eyes of said user, said display device comprising at least a display screen on which images are shown and an optical system to guide an image shown on said display screen to the eye(s) of said user, said display device being formed as an integrated unit; and wherein said main body comprises a glasses frame having lower segments corresponding to the right and left eyes, said right-eye display means being provided on or in said lower segment of said glasses frame that is corresponding to the right eye whereas said left-eye display means being provided on or in said lower segment of said glasses frame that is corresponding to the left eye.

16. A main body which is a component of an image display device, said main body comprising:

a main body that can be worn on the head of a user;

right-eye display means for displaying a predetermined image, said right-eye display means being provided on or in said main body in such a manner that said image is blurred or beyond the visible range of the right eye of said user when said user wearing said main body on his or her head looks straight ahead, and that said image is caught by the right eye of said user when said user moves his or her straight-looking right eye away; and left-eye display means for displaying a predetermined image, said left-eye display means being provided on or in said main body in such a manner that said image is blurred or beyond the visible range of the left eye of said user when said user wearing said main body on his or her head looks straight ahead, and that said image is caught by the left eye of said user when said user moves his or her straight-looking left eye away;

good visibility being obtained for both eyes when said user wearing said main body on his or her head looks straight ahead, said right-eye display means and/or said left-eye display means being provided in such a manner it/they can be positioned and fixed to said main body at a certain position or positions suited for the right and left eyes of said user, and further comprising:

at least a display screen on which images are shown and an optical system to guide an image shown on said display screen to the eye(s) of said user, said main body being adapted to be worn on the head of said user, said main body comprising right-eye holding means and left-eye holding means for firmly holding said right-eye display means and said left-eye display means, each of which is formed as an integrated unit, at appropriate positions; and wherein said main body comprises a glasses frame having lower segments corresponding to the right and left eyes, said right-eye display means being provided on or in said lower segment of said glasses frame that is corresponding to the right eye whereas said left-eye display means being provided on or in said lower segment of said glasses frame that is corresponding to the left eye.

* * * * *